No. 746,658. PATENTED DEC. 15, 1903.
T. K. BARLEY.
HAY RAKE.
APPLICATION FILED JULY 30, 1903.
NO MODEL. 2 SHEETS—SHEET 2.
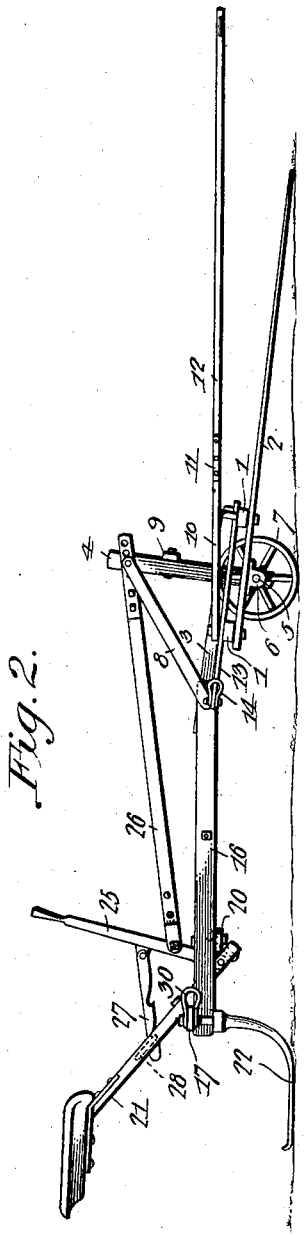
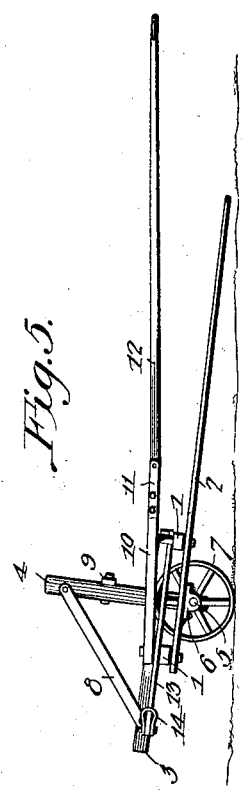
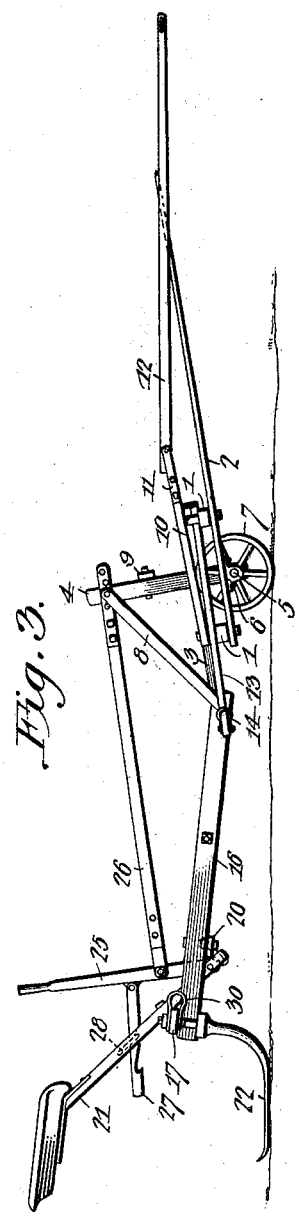
Thomas K. Barley, Inventor.

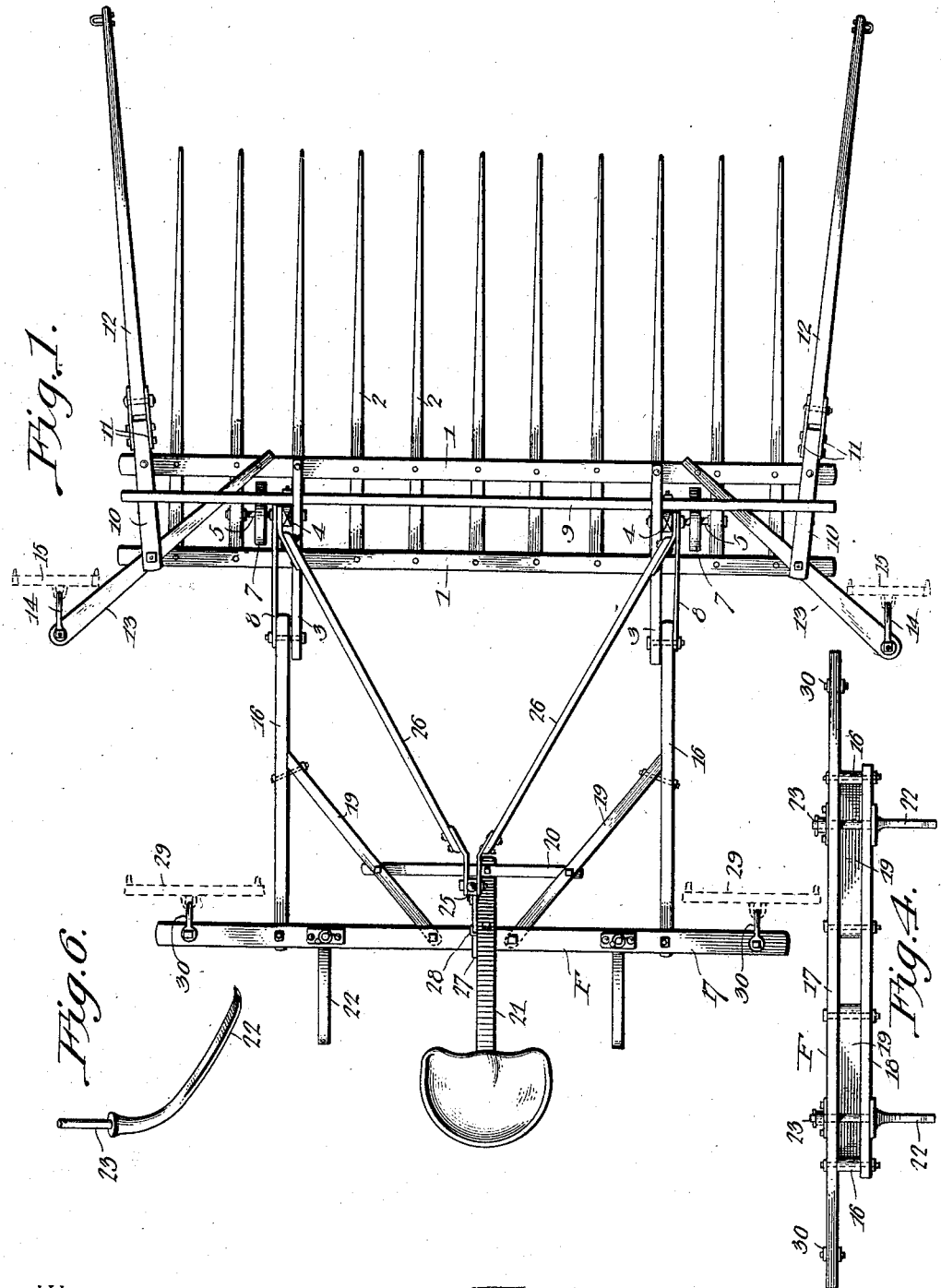

No. 746,658. Patented December 15, 1903.

UNITED STATES PATENT OFFICE.

THOMAS K. BARLEY, OF SEDALIA, MISSOURI.

HAY-RAKE.

SPECIFICATION forming part of Letters Patent No. 746,658, dated December 15, 1903.

Application filed July 30, 1903. Serial No. 167,614. (No model.)

*To all whom it may concern:*

Be it known that I, THOMAS K. BARLEY, a citizen of the United States, residing at Sedalia, in the county of Pettis and State of Missouri, have invented a new and useful Hay-Rake, of which the following is a specification.

This invention relates to horse hay-rakes, and more especially to what are known as "push-rakes," in which the rake is arranged in front of the horses, but is also applicable, in part, to sweep-rakes, in which the horses are arranged at the ends of the rake-head.

The object of the invention is to provide an improved form of rake adapted for use in raking alfalfa, Hungarian grass, millet, and other heavy hays which are raised by plowing the soil, and hence, owing to the roughness of the surface of the ground by plowing, require a strong and powerful rake to withstand the strains to which the rake is subjected when used in raking such hays.

A further object of the invention is to provide an improved construction of rake in which the tractive effort of the draft-animals may be made use of to assist the operator in lifting the loaded rake.

A further object of the invention is to provide a simple and effective machine for locking the rake in elevated position, so that the hay thereon may be conveniently transported from the field to the stack.

A further object of the invention is to provide guide-poles formed in sections pivotally connected in such manner that the forward ends thereof may be moved up and down freely and the necks of the horses be relieved of all weight from the rake or its load.

A further object of the invention is to provide an improved form of support for the rear end of the push-frame, upon which the driver's seat is mounted, in order to make the passage of the rake over the ground as free as possible from jolting, so that the operator may not be thrown from his seat.

In attaining the objects above stated I make use of the peculiar construction and combination of parts hereinafter described, illustrated in the accompanying drawings, forming a part of this specification, and having the novel features thereof particularly pointed out in the appended claims.

In the drawings, Figure 1 is a plan view of the rake. Fig. 2 is a side elevation with the rake-teeth lowered. Fig. 3 is a side elevation with the rake-teeth elevated. Fig. 4 is a view from the rear of the transverse bars and forming the rear of the push-frame and the runners carried thereby. Fig. 5 is a side view of the rake detached from the push-frame and used as a sweep-rake. Fig. 6 is a detail view in perspective of one of the runners.

In the several views corresponding parts are designated by the same characters of reference throughout.

Referring now to the drawings, 1 1 designate tranverse bars, to which the rake-teeth 2 are securely bolted on the under side of said bars.

3 3 are longitudinal bars bolted on top of bars 1 1 over two of the rake-teeth 2 by means of the same bolts which serve to attach said rake-teeth to the transverse bars 1 1.

4 4 are tilting posts rigidly secured to horizontal bars 3 3 and pierced at their lower ends for the passage of axles 5 5, which are supported in bearings 6, bolted on the lower surface of certain of the rake-teeth 2.

7 7 designate wheels rotatably mounted on the axles 5.

8 8 are oblique brace members extending downwardly and rearwardly from the tops of tilting posts 4 4 to the rear ends of longitudinal members 3 3.

9 is a tranverse bar bolted to the tilting posts 4 4 intermediate of their ends and on the forward side thereof, as shown.

The transverse bars 1 1, the longitudinal bars 3 3, tilting posts 4 4, braces 8 8, and transverse bar 9, taken together, form a rake-head by which the rake-teeth 2 are supported in proper relation to the ground over which the rake travels.

Bolted on top of the transverse bars 1 1, near the ends thereof, are sections 10 of guide-poles which extend forward and outward, one on either side of the rake-teeth 2. Securely bolted to the forward ends of the rear sections 10 of the guide-poles are plates 11, said plates being arranged in pairs and one pair being provided on each of said rear sections 10. Between each pair of plates 11 is pivotally mounted a forward section 12 of one of the guide-poles, the pivot upon which each of said sections 12 swings being disposed in a horizontal plane, and therefore permitting free movement in the vertical plane. Each of said sections 12 is provided at its forward end with suitable means for securing the same to the collar or breast-strap of a horse. Also bolted to the transverse bars 1 1 and extending rearwardly and outwardly therefrom are draft-bars 13, each of which terminates at about the same distance to the rear of the rake-head as the longitudinal bars 3 3 mentioned in a preceding paragraph. Each of the draft-bars 13 is provided near its rear end with a clevis 14, to which is attached in the usual manner a swingletree 15. The horses hitched to said swingletrees 15 are also secured to guide-poles, above mentioned, so that they are always in position to pull forward.

Pivotally mounted on the bolts connecting the braces 8 and longitudinal bars 3 are the forward ends of side bars 16 of a push-frame, (designated generally as F.) The side bars 16 are bolted at their rear ends to a transverse bar 17, which rests on top of the side bars 16 and are also secured to a shorter transverse bar 18, arranged immediately below the side bars 16, as best seen in Fig. 4. The side bars 16 are held in proper relation with transverse bars 17 and 18 by means of oblique brace members 19, bolted at their forward ends to the side bars, as seen in Fig. 1, and at their rear ends to the transverse bars. A short transverse bar 20 is securely bolted on the lower surface of the braces 19, as seen in Figs. 3 and 4, and a seat-post 21 is supported in inclined position upon the push-frame F by means of bolts which pass through said seat-post and through transverse bar 17 and transverse bar 20, as seen in Fig. 1.

The push-frame F is supported by means of swiveled runners or slides 22, each of which comprises a cylindrical shank 23, which is long enough to extend upward through the transverse bars 17 and 18, upon which it is secured by means of washers and a cotter-pin passing through the upper end of the shank and a lower curved portion which extends normally to the rear of the push-frame and which is preferably formed of steel, so that it may have both toughness and resiliency. The runners 22 pass over the ground with very little friction and are long enough to cause the push-frame to pass over the ordinary irregularities of the plowed ground, as well as over small ditches and other obstacles, without imparting any material jolt or jar to the operator of the rake, who rides upon the seat 21ª, carried by seat-post 21. Pivotally attached to the lower end of seat-post 21 is a lifting-lever 25, which is connected with the tilting posts 4 by means of the forwardly-diverging lifting-rods 26, which are pivotally connected at one end with lever 25 and at their other ends with the tilting posts 4. The lifting-lever 25 also carries pivotally mounted thereon a rack-bar 27, which extends rearwardly through a staple 28, provided on the seat-post 21. The notches of the rack-bar are disposed downwardly, as best seen in Figs. 3 and 4, and are adapted to engage with the lower part of staple 28 to lock the lifting-lever in position to hold the rake-teeth tilted upward, as seen in Fig. 4.

The swingletrees 29 are attached by means of clevises 30 to the ends of transverse bar 17, forming, together with the swingletrees provided on draft-bars 13, means for attaching four horses to the rake for draft purposes.

By having the point of connection between side bars 16 of the push-frame and longitudinal bars 3 of the rake-head a considerable distance behind the axles forming the fulcrum upon which the rake-head is tilted the tractive effort of the horses hitched to the ends of tranverses bar 17 of the push-frame is made available to assist in raising the rake-teeth into the position shown in Fig. 1 when it is desired to transfer a load of hay from the field to the stack-yard. By mounting the draft-bars 13 above the axles upon which the rake-head is supported the tractive effort of the horses attached to said draft-bars is made use of to hold the rake-teeth in operative position, as shown in Fig. 2, while the ends of the draft-bars are elevated; but when the rake is lifted, as shown in Fig. 3, and the ends of the draft-bars are lowered the tractive effort of the horses is without effect upon the position of the rake.

In using the rake the teeth will be held in contact with the ground, as already explained, the lifting-lever then being allowed to take the position shown in Fig. 3 and the ends of draft-bars 13 then being elevated. When the rake is loaded with hay or when for any reason it is desirable to elevate the forward ends of the rake-teeth, the operator will grasp the upper end of the lifting-lever and pull backward thereon. The pull of the operator aided by the tractive efforts of the horses attached to the ends of transverse bar 17 will cause the rake-teeth to swing upward to the position shown in Fig. 4, and the rack-bar 27 is moved backward until the forward notch therein engages with staple 29 upon seat-post 21, as seen in Fig. 4, thus retaining the teeth of the rake in the position shown in Fig. 4 as long as may be desired.

When the hay to be raked is upon a meadow or smooth field upon which a lift-rake is unnecessary, the push-frame may be detached, as shown in Fig. 6, and the forward section of the rake may be used without the push-frame, thus converting the rake into a sweep-rake. The operator may walk behind the rake when used in this way or a seat may be placed thereon.

It will be seen that in the rake constructed as above described all superfluous parts have been done away with and the mechanism has been reduced to an extremely simple type, which is well adapted to withstand strains to which the rake is subjected when used in raking the heavy hays, such as those mentioned in a preceding paragraph.

While I have shown and described the preferred form of embodiment of my invention, it is obvious that changes may be made in the form, proportions, and exact mode of assemblage of the elements shown and described without departing from the spirit of the invention or sacrificing any of its advantages.

Having thus described the construction and operation of my invention, what I claim as new, and desire to secure by Letters Patent, is—

1. The combination in a rake, of a rake-head, a draft-bar attached to each end of said rake-head, and a jointed guide-pole provided at each end of said rake-head adjacent to each of said draft-bars.

2. The combination in a rake, of a rake-head, a draft-bar at each end of said rake-head, and a guide-pole consisting of two sections pivotally connected to permit vertical movement and prevent lateral movement attached to said rake-head adjacent to each of said draft-bars.

3. The combination in a push-rake, of a tilting rake-head, a push-frame pivotally connected with said rake-head, a fixed seat-post on said push-frame, a lifting-lever pivotally attached to said seat-post, connections between said lifting-lever and said rake-head, a staple provided on said seat-post, and a pivoted rack-bar carried by said lifting-lever and adapted to engage said staple.

4. The combination in a push-rake, of a tilting rake-head, a push-frame pivotally connected with said rake-head, a seat-post rigidly mounted on said push-frame, a projecting member on said seat-post, a lifting-lever pivotally attached to said seat-post, a connecting-bar between said lever and said rake-head, and a latch carried by said lever and engaging the projecting member mounted on said seat-post.

5. The combination in a push-rake, of a tilting rake-head, a push-frame pivotally connected with said rake-head, a fixed seat-post mounted on said push-frame, a lifting-lever pivoted to said seat-post, a guide-loop carried by said seat-post, a connecting-rod between said lever and said rake-head, and a notched latch-bar pivoted to said lever and extending through said loop.

6. The combination in a push-rake, of a rake-head supported on axles secured to the under side of said head, longitudinal bars extending rearwardly from said head, a push-frame supported at its rear end and pivotally connected at its forward end with the rear ends of the rearwardly-extending bars on the rake-head, draft devices supported on said rake-head and disposed to the rear thereof, and means provided on said push-frame for raising and lowering the rear ends of said longitudinal bars.

In testimony that I claim the foregoing as my own I have hereto affixed my signature in the presence of two witnesses.

THOMAS K. BARLEY.

Witnesses:
C. P. KECK,
W. H. PARNELL.